United States Patent [19]
Jensen

[11] Patent Number: 5,591,341
[45] Date of Patent: *Jan. 7, 1997

[54] METHOD AND SYSTEM FOR WATER BIOREMEDIATION UTILIZING A CONICAL ATTACHED ALGAL CULTURE SYSTEM

[76] Inventor: Kyle R. Jensen, 1168 Woodland Terrace Trail, Altamonte Springs, Fla. 32714

[ * ] Notice: The term of this patent shall not extend beyond the expiration date of Pat. No. 5,573,669.

[21] Appl. No.: 474,498

[22] Filed: Jun. 7, 1995

Related U.S. Application Data

[63] Continuation-in-part of Ser. No. 399,204, Mar. 6, 1995, which is a continuation-in-part of Ser. No. 893,246, Jun. 2, 1992.

[51] Int. Cl.$^6$ ....................................................... C02F 3/32
[52] U.S. Cl. ........................... 210/602; 210/170; 210/241; 210/242.1; 47/1.4; 47/59; 56/8
[58] Field of Search ............................ 47/1.4, 59, 60, 47/65; 56/8, 9; 210/170, 241, 242.1, 242.3, 525, 527, 602, 778

[56] References Cited

U.S. PATENT DOCUMENTS

| | | | |
|---|---|---|---|
| 3,004,672 | 10/1961 | Conley et al. | 210/527 |
| 3,969,249 | 7/1976 | Dodd | 210/527 |
| 4,166,036 | 8/1979 | Barnhouser | 210/527 |
| 4,253,271 | 3/1981 | Raymond | 47/1.4 |
| 4,333,263 | 6/1982 | Adey | 47/1.4 |
| 4,813,997 | 3/1989 | Kinnersley et al. | 47/1.4 |
| 5,197,263 | 3/1993 | Midtling et al. | 210/242.3 |
| 5,254,252 | 10/1993 | Drenner | 210/602 |

Primary Examiner—Thomas G. Wyse
Attorney, Agent, or Firm—Allen, Dyer, Doppelt, Franjola & Milbrath, P.A.

[57] ABSTRACT

A conical floway culture system for cleansing water of pollutants is presented that has a downward slope between the central region and the outer edge and a wall for retaining water within the floway. The water-impervious bottom surface has a texture conducive for growing an algal turf. In use, water is admitted into the floway from the waterway and is permitted to flow over the algal turf. The algal turf bioassimilates the pollutants and thereby cleanses the water, and the water is discharged in a cleansed condition. Mature algal turf is harvested periodically by an angled plowing system having a notched, fixed, or rotating scraper that travels in a downward spiral path, pushing harvested algal turf downslope toward the outer edge.

22 Claims, 5 Drawing Sheets

METHOD AND SYSTEM FOR WATER BIOREMEDIATION UTILIZING A CONICAL ATTACHED ALGAL CULTURE SYSTEM

CROSS-REFERENCE TO RELATED APPLICATION

This application is a continuation-in-part of copending application, Ser. No. 08/399,204, filed Mar. 6, 1995, which is a continuation-in-part of copending application "Method and Apparatus for Water Purification by Culturing and Harvesting Attached Algal Communities," Ser. No. 07/893,246, filed Jun. 2, 1992.

BACKGROUND OF THE INVENTION

The removal of chemical contaminants from wastewater and ground water has become an important problem in restoring ecological balance to polluted areas. It is known that some algal species are capable of absorbing heavy metals into their cell walls, thus reducing their toxic effects on the environment. Algae can also take up nutrients and micronutrients that may be present in overabundance, such as potassium, nitrogen, iron, aluminum, and calcium, and can thus be utilized to provide a remediating ecosystem. A system used to effect this uptake is known as periphyton or algal turf. A further advantage to this technique is that the enriched algae can be harvested and used as fish or animal feed, which serves to return the nutrients to the food chain.

Periphyton filters (PF) or algal turf have the potential for use in a variety of applications. For example, the turf can be used to replace biological or bacteriological filters in aquaria. As mentioned, algal turf can be used to remove nutrients and other contaminants from polluted waters. In addition, by harvesting the algal mass, various processes can be used to produce a biomass energy source such as methane or ethanol, fertilizer, a human or animal food additive or supplement, cosmetics, or pharmaceuticals.

Studies in algal turf production are known in the art. For more than 20 years, tropical reefs have been acknowledged to be among the most productive of natural systems. For example, in Lewis, "Processes of Organic Production on Coral Reefs," pp. 305–347, 52 Biol. Rev. (1977), coral reefs are cited as being among the highest producers in primary production values for pelagic, benthic, and terrestrial ecosystems.

Notwithstanding the values demonstrated in some earlier literature, recent efforts have demonstrated that those estimates of reef primary productivity were conservative. The mean reported value, 10.3 $G/m^2/day$, should be contrasted to values ranging from 19.2 to 32.7 $G/m^2/day$ in a 1980 study on St. Croix reefs. Recent studies have demonstrated that algal turfs in conjunction with wave surges have been identified as the primary source of most reef productivity. The latest large-scale pilot plants in fresh water agricultural irrigation waters having algal turf or periphyton scrubbers with variable wave energies have repeatedly demonstrated productions averaging 35 $g/m^2/d$, with peaks well over 40 $g/m^2/d$.

It is known that the removal or reduction of wave surge motion can reduce primary productivity, and that the subtle manipulation of light in various patterns across the growing surface can fine tune the performance of periphyton filters or algal turf. This permits a desired speciation of algal turf to dominate, and thus specific forms of a particular pollutant can be more effectively removed. In some areas such as reef systems, a typical diurnal oxygen concentration cycle in a reef microcosm can be greatly affected by wave surge action. Fresh water systems are less affected.

Algal turf techniques have been disclosed in Adey's U.S. Pat. No. 4,333,263, "Algal Turf Scrubber," and the present inventor's U.S. Pat. No. 5,131,820, "Low Pressure, Low Head Buoyant Piston Pump for Water Purification." Adey teaches that a surge is necessary in algal turf scrubbers.

Additionally, a body of literature deals with algal techniques for waste recycling, oceanic farming, and the like. Contemporary research can be grouped in two distinct categories: that utilizing macroalgae and that using planktonic algae. The first group is discussed in Ryther et al., "Physical Models of Integrated Waste-Recycling Marine Polyculture Systems," Aquaculture 5, 163–77 (1975); California Institute of Technology, Graduate School Project, "Evaluating Oceanic Farming of Seaweeds As Sources of Organics and Energy," U.S. Department of Energy, Division of Solar Technology, Contract E (04-3)-1275; and Washington State Department of Natural Resources, "Aquaculture of Seaweeds on Artificial Substrates," U.S. Department of Commerce, Contract R/A-12. The case of planktonic algae is discussed in Goldman et al., "Relative Growth of Different Species of Marine Algae in Wastewater-Seawater Mixtures," Marine Biology, 28, 17–25(1974); Karolinska Institute, "Investigation of an Integrated Aquatic System for Storing Solar Energy in Organic Material," Namnden for Energiproduktionforskning, No. 53 3065 062; and State of Hawaii Natural Energy Institute, "Energy from Algae of Bioconversion and Solid Waste," Hawaii State Government.

In neither case has research to date utilized wave surge motion to enhance the exchange of metabolites between algal cells in the water medium. Also these known research techniques have not recognized the criticality of macroalgae size, vis-a-vis the shading of one cell by another. Accordingly, such techniques are not suitable for optimum biomass production, and the propensity of removing nutrients and other contaminants from polluted waters is severely limited.

Harvesting has been accomplished in prior art systems by simply scraping the algae off the surface, but this often incompletely removed portions of the algae and allowed these fragments and particles to be discharged into the water system. Thus the nutrients previously incorporated into plant mass or otherwise trapped were dislodged, decomposed, broken into small pieces, and flushed back into the waterway upon restarting the process design flow rates. It was to improve upon the procedure of growing, harvesting, and processing the algae and other trapped particulates and organisms on a large scale (acres or more) and to enable the construction of facilities in an economical fashion, across various geological surfaces with low bearing pressures, which optimize growing conditions for the algal or periphytic community and allow effective removal of bioassimilated or trapped pollutants after they have been taken up from the water, that the present invention was developed.

SUMMARY OF THE INVENTION

As previously described, algal turf possesses the highly advantageous ability of being able to take up, precipitate, adsorb, or otherwise trap undesirable nutrients, contaminants, or minute particulate matter contained in water to be treated, and to incorporate such nutrients into their plant mass and promote a periphytic community of superior particulate trapping ability. Accordingly, by causing the water to be treated to flow in a prescribed manner over the algal turf, the undesirable nutrients and pollutants can be removed from the water, with the treated water thereafter being permitted to flow back into the lake, marsh, or other waterway or basin in a greatly improved condition.

Utilized in conjunction with this invention are microalgae of the major groups of photosynthetic benthic algae. In the course of describing and claiming this invention, the terms "periphyton" and "algal turf" are to be construed not only as the filamentous algae, but the periphytic mat or community of matter that is allowed or caused to exist with the filamentous algae. The latter includes but is not limited to: filamentous algae rooted by holdfasts on a surface; epiphitic or clinging plants and animals that grow or are caused to grow from, or in the presence of, the filamentous algae, and the particulate matter trapped or otherwise detained in the course of manipulation of previously described elements and/or all matter that can be removed from the floway via the harvesting process.

Another term used herein that is to be construed in a broad way is "mature algal turf." By mature algal turf is meant the algal turf at a time or range of times at which its production reaches a point where, owing to size, development, or other reasons, a significant portion of the community comprising the algal turf becomes unstable physically and is released from its attachment and moves undesirably from its captive growing area such that it cannot be harvested. In many instances, the algal turf matures in 7 to 15 days, but the invention is not intended to be limited to this number of days.

In accordance with this invention, a form of waterway, called a floway, is utilized, the bottom surface of which is provided with a substrate conducive for growing a bed of algae to form an algal turf. This floway in use acts as a periphyton falter (PF) or an algal turf farm, and in the present invention has a significantly longer flow distance and less or no wave. surge action in some cases, as distinct from previously disclosed systems.

A basic configuration of the algal turf floway, over which the water to be cleansed is caused to flow continuously (except for short durations at harvest), in the present invention takes a generally conical form. The floway has an inner central region, an outer circumferential edge, a radius, and a downward slope between the central region and the outer edge. In an alternate embodiment, the slope has an opposite orientation, tending downward from the outer edge toward the central region.

In general terms the floway comprises means for admitting the water to be cleansed that is positioned at the central region. In a specific embodiment a hole at the central region serves as the admitting means. There are also provided means for transporting the water to be cleansed from the waterway to the hole in the central region, such as a standpipe.

Typically a first canal or pipeline brings water from the waterway to an upstream weir or feed pipe, so that predictable quantities of water can flow over or through the upstream weir/feed pipe and onto the floway.

The floway further comprises means for retaining water within the floway, such as a circumferential wall positioned around the outer edge. Cleansed water is discharged from the floway typically from a weir that is movable between an open position and a closed position. A peripheral gutter and second pipeline are utilized to receive the outflowing water and deliver it back into the waterway.

A water-impervious bottom surface extends from the central region to the outer edge. The bottom surface has a texture conducive for growing a bed of algae to form an algal turf. In a particular embodiment the bottom surface comprises a plurality of generally upwardly extending diversion tabs, which are notched in a preferred embodiment, for trapping filamentous algae and particulates and further for enhancing mixing of flowing water and for preventing the flowing water from forming channels between the central region and the outer edge. These tabs should be sufficiently rigid to accomplish these tasks, but sufficiently flexible to avoid interfering with a harvest.

In use, water is admitted into the floway from the waterway and is permitted to flow over the algal turf growing on the bottom surface. The algal turf bioassimilates, traps, and/or precipitates the pollutant from the water and thereby cleanses the water, and the water is discharged after a predetermined time in a cleansed condition.

Work with large-scale periphyton filtration has shown that water flow speed is critical. By utilizing a centrally fed conical growing surface, the central feed region has a circumference that is smaller than the outer edge, increasing as pi times the diameter.

Once the algal turf has reached maturity, it preferably should be harvested from the bottom surface. Typically the turf is harvested in a dewatered but wet state. The algal turf is removed in such a manner not to permit any significant portions of the mature algal turf to remain in a dislodged and broken down condition such that it is flushed over the outflow weir, and thence back into the waterway after harvest.

The preferable means for harvesting the algal turf is closely linked to the culture surface itself. Previous methods relied on vacuuming the turf from the culture surface. A less expensive alternative was to scrape or plow the algal turf from the growing surface. However, the algal turf quickly overflows the plow, and a significant portion of the algae remains behind. If spiral harvesting is performed with a scraper from the central outward and downward toward the outer edge, this undesirable overflowing of algae does not occur because there is more area for the algae to be stacked, and it is downhill from the scraper. With a suitably sloped conical floway substantially all of the mature algal turf can be removed. Recirculation of the "first flush" upon startup for a predetermined period can reduce the amount of dislodged but unharvested periphyton.

Previous systems for the culture and harvest of mature algal turf were quite heavy and required grade beams to support the weight of the harvester on soft soils. The advantage of the scraping scheme is that the scraper is a simple plowlike machine with wide tires to distribute the weight.

In the simplest form one or more simple angled scrapers, which may be flat or notched, deflect aside the algae; in another a brush/scraper element rotates to dislodge the turf from the growing surface. In still another configuration the plow is replaced with a conveyer belt with ribs that engage the culture surface and convey the harvest slurry outward as the plow/scraper travels on its spiral path. A variety of designs and materials for this element, as well as of rotational speeds, have been tested to optimize harvesting efficiency.

The harvest typically occurs at predetermined intervals, which as mentioned may range from 7 to 15 days. In general the frequency of harvesting, which may vary from site to site, is dependent on light levels, temperature, water culture nutrient concentration, micronutrient concentration, and flow action. The harvester used should be able to remove mature algal turf from the bottom surface while at the same time avoiding removing algal holdfasts from the bottom surface. This is necessary in order to permit algal turf regeneration following harvesting.

Algal turf growth can be achieved in an aqueous environment by providing a suitable area in which spores may settle. The first colonizations are usually microscopic diatoms, which are then rapidly dominated by the turf species. In accordance with the present invention, the harvesting of such turfs must occur before they are overgrown in turn by the larger macroalgae or macrophytes, thus keeping production rates at a high level and minimizing predation by grazing microorganisms.

Immediate regrowth of the algal turf will occur if the floway's bottom surface or substrate is sufficiently coarse to allow a filamentous base of the algae to remain following harvesting. Typically, such a surface can be a plastic screen having screen grid dimensions in the range of approximately 0.5 to 5 mm, or another highly textured surface, such as plastic membranes and films, concrete, asphalt, asphaltic rubber, or naturally occurring geologic features. These surfaces preferably have a suitable texture to provide protection from overharvesting, which can occur on smooth surfaces when the holdfasts are removed along with the mature algal turf. Conversely, there should not be voids in the surface such that organisms can find suitable domicile and consume and excrete algal turf as well as reproduce in numbers that limit the ability of the algal turf community to remove pollutants. There may, however, be small rodlike appendages or tabs in all or a part of the floway extending from the growing surface to slightly above the water surface to catch broken-off algal turf and reduce channeling. These remain on the surface during harvest and do not hamper the harvesting process. Examples of these surfaces may include, but are not limited to, rock formations, metals, wood, plastics, fiber-reinforced plastics, glass, ceramics, soils, woven or processed natural fibers, and higher-order plants.

It has been demonstrated that an important relationship exists between the texture of the bottom surface and the colonization and harvesting efficiency of the algal turf system. Specifically, characteristics to be considered include texture amplitude and geometry, the spacing of textural elements in both the longitudinal and transverse directions, and the pattern, roughness, height, and distribution of the elements. Various textural elements can be used in combination, and such patterns tailored to the needs of a particular site, including the slope of the floway, the desired channeling patterns of flowing water, and the design of the harvesting apparatus.

A longer floway run than used in previously disclosed systems has been found to exploit a pH-driven contaminant precipitation process that does not occur to this extent naturally, nor in shorter floway systems. During the growth cycle, algae consume carbon, which is provided by decaying material, the supply of which is never exhausted. With a longer floway and repeated harvesting, decaying material is removed, and the algae utilize other sources of carbon, such as bicarbonate. This causes a rise in pH, which in turn causes a precipitation of phosphorus and other compounds from the water. Aeration or addition of water to be treated returns the pH to normal levels.

In particular sites the inflowing water may have an undesirably low pH. The addition of lime and calcium phosphate to the inflow water can partially remedy this situation, while at the same time adding phosphorus, a primary nutrient for the growing algae. An exemplary reaction for such a process is:

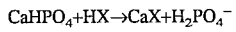

Of course, the specific stoichiometry depends upon the composition of the waste stream. The advantage of using such salts is that these substances remain solid until reacting with an acidic waste stream; for instance, calcium phosphate salts are not soluble in water at circumneutral and alkaline pH values. It is likely that the phosphate salts $CaHPO_4$, $Ca_{10}(PO_4)_6(OH)_2$, and $FeNH_3PO_4$ would be the most useful, with the iron salt having the added advantage of providing both nitrogen and phosphorus to the algal turf species. Calcium can react with metal ions to precipitate chemically a portion of the metals in the waste stream. The extent of calcium precipitation of metals will depend upon the pH, calcium concentration, and metal concentration.

It is known that the cleansing function provided by the algal turf is assisted by having the lower algal turf filaments flashed with light, for this greatly assists the photosynthetic action of plant cells covered by algal turf or of organisms growing on top of them. To this end, a suitable means at a location adjacent the central region is utilized for creating a variable flow action. This means is actuated periodically to cause a wave to pass substantially across all or part of the length of the floway. This can in some water systems serve to promote growth of more diverse types of algal turf, such as filamentous algae, on which other epiphytic or attached plants and animals can thrive. The flowing can also cause the algae to separate and articulate, thereby exposing more of the filaments to sunlight by preventing a continuous shading of one cell by an adjacent cell.

Water turbulence is another important variable, as it is known in the art that the highest productivities are obtained at the boundary of laminar flow and turbulent flow. The use of a conical floway affords a wide range of flow conditions, from, for example, several feet per second to an inch or less per second, and also provides a high flow zone and a large low-turbulence zone. These different conditions additionally promote a wide diversity of algal species.

As discussed above, microinvertebrates left behind after harvesting can proliferate and consume significant portions of the mature algal turf and excrete pollutants previously absorbed by the algal turf. The brush/scraper element and bottom surface texture are preferably optimized to permit maximum removal of these organisms. Specifically, the elements are designed geometrically to cooperatively enhance destruction of unwanted organisms.

A particular example of such an organism is the midge larva "chironomid," a linear organism that builds a Quonset-hut-like shelter from algae and detritus. If the surface bottom texture and brush/scraper are designed with a linear geometry oriented transverse to the floway, the chironomid shelter is protected from removal by the harvester; however, if the elements are nonlinear, effective removal is possible. It has been found that air or water spray nozzles can be effective in removing chironomids from heavy-textured surfaces. The specific pressures are adjusted to avoid damaging the algal holdfasts.

The present invention additionally comprises a method for controlling an undesirable microorganism population level in an algal turf floway. The method, which utilizes a conical floway as described above, comprises the steps of growing an algal turf on the bottom surface, the algal turf comprising and algal species and the undesirable microorganism population. Such an undesirable population may include such species as chironomids. When the water is discharged from the downstream end of the floway, and the mature algal turf is harvested, instead of immediately refilling the floway, the culture surface is permitted to dry for a time sufficient to significantly reduce the population level of the undesirable microorganism but insufficient to eradicate the algal species in the algal turf. The length of drying time can be tailored to the specific organisms in the culture, but generally will range from 1 to 24 hours, depending on the rain conditions. Night time harvests may be timed such that dryout conditions are minimized or maximized.

A system without infestation by microinvertebrates can be managed without mechanical harvesting. In this case water flow turbulence causes a sloughing off of the mature algae, which are then strained out of the water after leaving the floway by means such as a continuous rotary strainer or screening device. This system, while it cannot offer the performance of the mechanical harvester discussed above, is very low maintenance.

A desirable effect may be attained by constructing floways in groups of two or more, water from the outlet of a first floway being directed to the inlet of a second floway, etc. Between the floways may be positioned means for cooling the water and/or lowering the pH, preconditioning the water for enhanced scrubbing action in the second floway. These means are to treat the water entering the second (or subsequent) floway to reach optimal growing conditions for the specific culture growing in the floway.

It has been shown that reseeding the floway surface with a desired species or mixed assemblage of plant and/or animal species can enhance the regrowth of the algal turf after harvesting and improve the overall performance of the system. Such a combination may include filamentous algae and diatoms, which together can grow rapidly and fill the entire water column.

An additional possible element of the purification system comprises means for degrading volatile organic compounds (VOCs) that may be present in contaminated ground water. In a particular embodiment this means comprises an ultraviolet reactor positioned downstream of the downstream weir of a floway. Ultraviolet light is known to promote degradation of chlorinated hydrocarbons such as trichloroethylene, trichloroethane, vinyl chloride, and others. The high oxygen and hydroxyl ion concentrations present in the outflow water aid in the removal of VOCs, which pass from aqueous to gas phase at the water-air interface, at which point the UV light degrades the VOCs.

It is therefore an object of this invention to provide a conical algal turf farm or culture surface having specific textural characteristics capable of being constructed in many geologic soil conditions that is able to function in a low-cost yet highly effective manner to cleanse the water of a pollutants, the water coming from runoff to or from a basin, lake, pond, river, or the like.

It is another object to provide an algal turf floway capable of being harvested by spiral scraping and plowing action.

It is a further object to provide such a floway in which contaminants may be precipitated out of the water flowing therethrough.

It is yet another object to provide water articulation action in all or part of the floway, to cause a more diverse algal turf to develop. The water is also naturally mixed, and physically nutrients and particulates are driven into intimate contact with algal cell walls across boundary layers, such that bioassimilation through photosynthesis and trapping action will be enhanced by the algal turf.

It is still another object to provide for the effective harvesting of mature algal turf in a dewatered but wet state by an angled plow-style scraper that travels spirally outward, pushing harvest slurry downstream to a larger-area sector to optimize harvesting economy.

A further object is to provide a method of reseeding specific algal species following a harvest, the species selected to enhance the proliferation of at least one alga chosen for its efficacy in removing contaminants from a given site.

Another object is to provide a system that does not require mechanical harvesting, but rather utilizes specific algal species, water turbulence, and screen filtering to remove sloughed-off mature algae.

An additional object is to provide ultraviolet irradiation of the outflow water for degrading chlorinated hydrocarbons such as trichloroethylene.

It is yet another object to provide a lightweight power-driven harvester with multiple pairs of low-pressure wide tires with low wheel loads, such a harvester having several styles of angled articulated scraper devices to plow biomass slurry downslope.

It is further object to provide a water-impervious growing surface for prohibiting water saturation of the underlying soft soil, which can reduce the bearing capacity of the soil.

It is an additional object to provide intermittent diversion means along the floway to limit flow channelization.

It is yet a further object to raise the pH of incoming low-pH water with alkaline, buffer, and nutrient media to enhance algal growth.

It is yet another object to vary the intensity of the light impinging on the algal surface by flashing and/or disturbing the water surface.

These and other objects, features, and advantages will be more apparent when the description is read in conjunction with the drawing.

DETAILED DESCRIPTION OF THE PREFERRED EMBODIMENTS

A description of the preferred embodiments of the invention will now be presented with reference to FIGS. 1–5.

Figure 1:
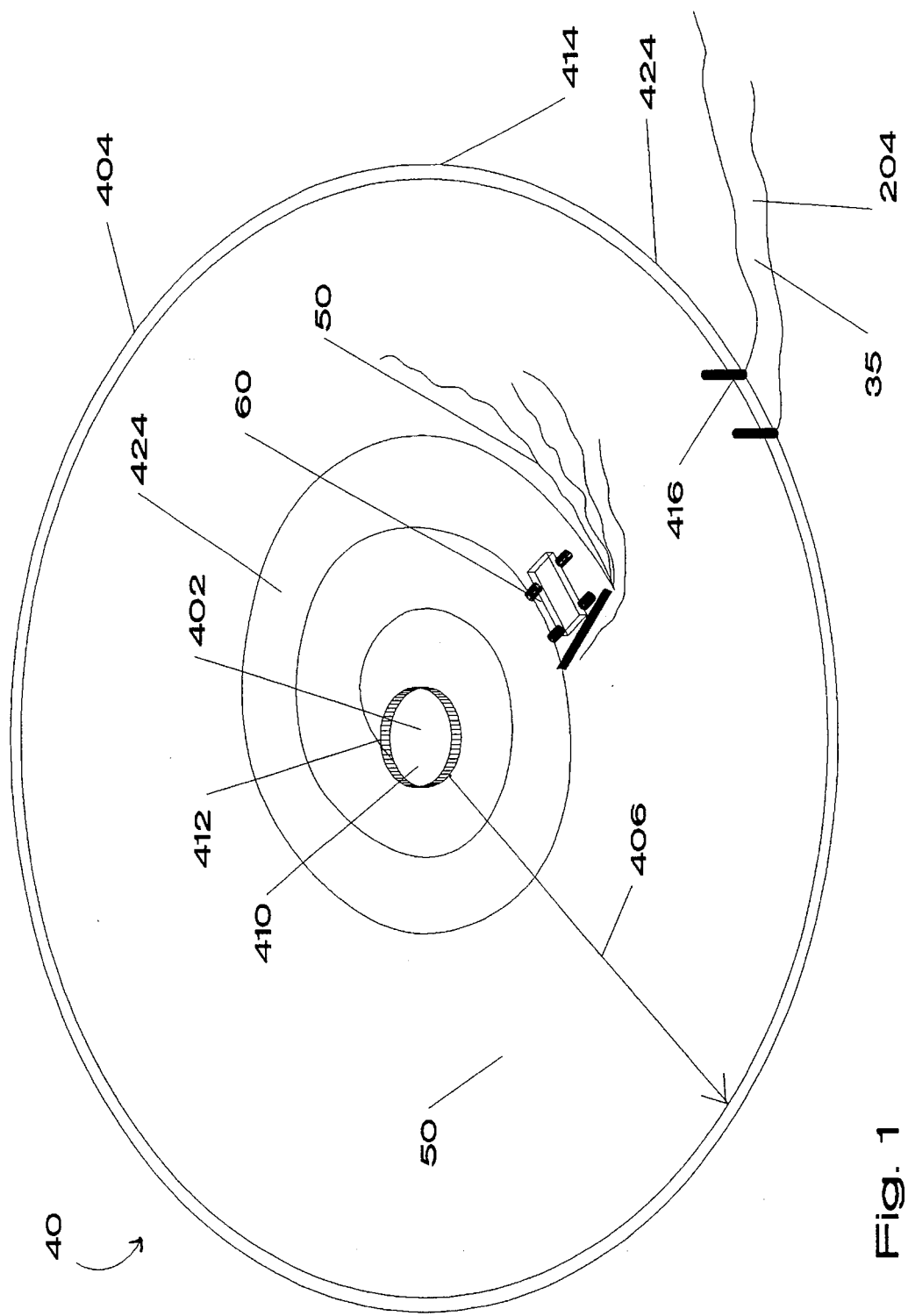
FIG. 1 is a perspective view of a conical floway.
Figure 2:
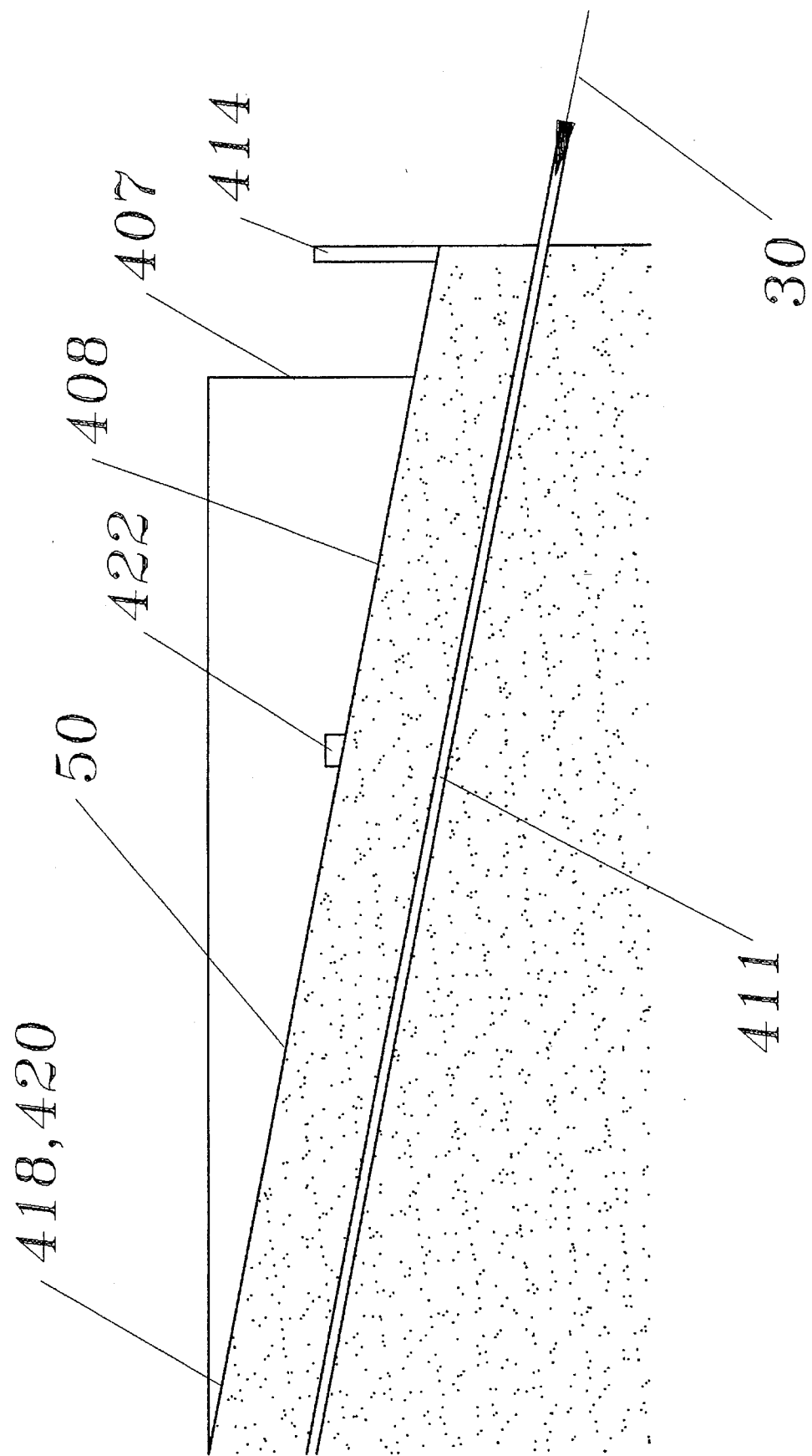
FIG. 2 is a cross-sectional view of the conical scheme.
Figure 3:
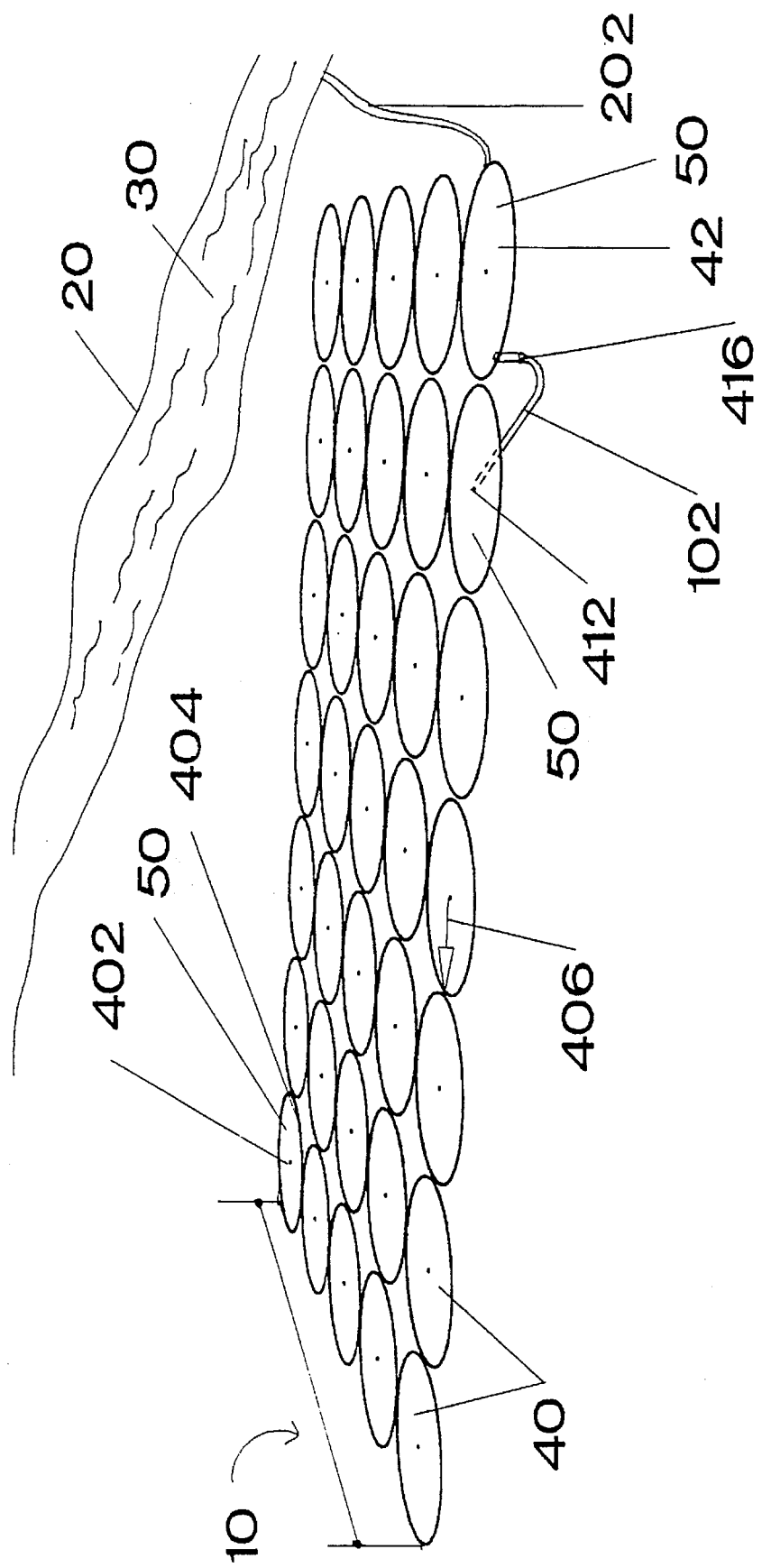
FIG. 3 shows a plan view of a treatment system comprising a plurality of floways.

With reference to FIGS. 1–3, an algal turf farm 10 is located adjacent a form of waterway 20 created for the continuous purification of water 3. A number of generally conical algal turf floways 40 are provided in which communities of algal turf 50 grow under suitable conditions and cleanse the water 30 of a pollutant. The floway 40 has an inner central region 402, an outer circumferential edge 404, a radius 406, and a downward slope 408 between the central region 402 and the outer edge 404. The slope 408 and radius 406 together define an elevation 407.

An alternate floway embodiment (not shown) slopes in the opposite direction, that is, from the outer edge to the central region.

The floway 40 comprises means for admitting the water 30 to be cleansed onto the floway 40, typically positioned at the central region 402. In a preferred embodiment, water 30 is transported from the waterway 20 via an inlet canal 202 through pipe 411 into a hole 410 in the central region 402 by means of a supply standpipe 412.

The water 30 is retained within the floway 40 by a circumferential wall 414 or curb positioned around the outer edge. Within the wall 414 is disposed an outflow weir 416 for discharging cleansed water from the floway. The weir 416 is movable between an open position and a closed position.

The floway radius 406 can in principle vary from 3 feet to 1 mile, with an exemplary embodiment being 500 feet. This dimension should be tailored to the particular site, and also to the need for enhancing the pH precipitation process discussed above.

The water-impervious bottom surface 418 extends from the central region 402 to the outer edge 404, and has a texture 420 conducive for growing a bed of algae to form an algal turf 50 thereon. This surface 418 can be of a wide range of materials as long as the texture is such as will enable algal holdfasts (roots) to remain after harvesting, while possessing the characteristics of compatibility with the harvest procedure, being able to withstand ultraviolet light, and being usable as a growing surface for an acceptable length of time.

It is typically preferable to use materials such as high-density polyethylene (HDPE) plastic or other plastic liners in soft soil areas, as well as natural limestone formations, concrete, asphalt, asphalt/rubber, and polymer combinations. In alternate embodiments, a hot asphalt rubber spray may be used on the membrane with or without reinforcing fibers, and also an aggregate textured surface may be used on the asphalt rubber.

The present inventor's previous work has illustrated a series of textural elements designed for use on the bottom surface of a floway. Each of these exemplary textures is used to optimize the purpose and population of an individual floway system, as well as the growing conditions. The surface should not be of such a nature as to permit algae-eating organisms to remain after harvesting, for should such organisms reproduce in large numbers, their excretion of digested biomass would limit filtration efficiency.

In a preferred embodiment the bottom surface 418 comprises a plurality of generally upwardly extending diversion tabs 422 for trapping filamentous algae and particulates and further for enhancing mixing of flowing water and for preventing the flowing water from forming channels between the central region and the outer edge. These tabs 422 may take the form of rodlike pins spaced intermittently or in patterns extending from the turf's growing surface to just above the water surface.

In use, water 30 is admitted into the floway 40 from the waterway 20 by standpipe 412 and is permitted to flow over the algal turf 50 growing on the bottom surface 418. The algal turf 50, as described, bioassimilates pollutants from the water 30 and thus cleanses it. Cleansed water 35 is discharged from the weir 416 after a predetermined time in a cleansed condition, and typically exits the system via an outlet canal 204.

Water treatment occurs while the water 30 is moving across the algal turf 50, at which time the pollutants come in contact with the algal turf 50 or are otherwise trapped by organisms in the periphytic mat. Algal turf is a diverse and stable community with respect to production in all seasons and comprises many organisms, which can include that which is ambient in the water system or a modified plant and animal community achieved through inoculation of nonambient constituents.

It is known that an optimum uptake of nutrients is accomplished by algal turf that is from 2 to 25 days old. Algal turf 50 that is approximately 7 to 15 days old is generally regarded as mature and is preferably harvested from the floway 40. The harvest intervals may be determined by monitoring the quantity of cells sloughing off the algal turf, with harvesting preferably undertaken prior to high slough conditions.

The harvester should be adapted to remove mature algal turf 50 from the bottom surface 418 and to avoid removing algal holdfasts from the bottom surface 418. This feature is of great importance so that the algal turf 50 can regenerate from the holdfasts following harvesting.

As shown in FIG. 1, a harvester 60 may be piloted, either automatically or manned, along a generally spiral pathway 424 between the central region 402 and the outer edge 404.

Figure 4:
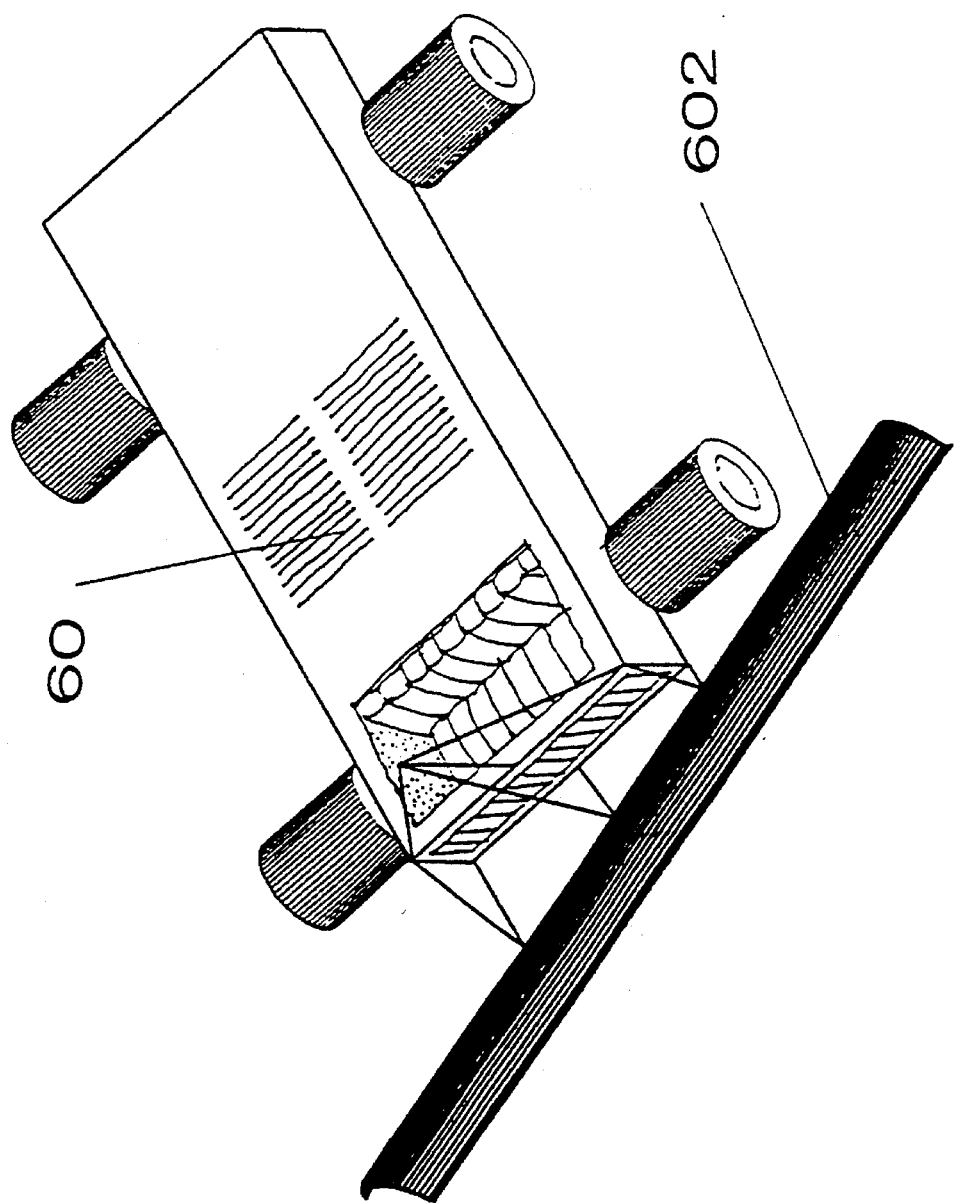
FIG. 4 is an axionometric view of a harvester scraper.

The harvester 60 in the embodiment illustrated in FIG. 4 comprises scraping means, specifically, a scraper 602 pushed by harvester 60. In this embodiment the harvester is adapted to move downward along a generally spiral pathway from the central region 402 to the outer edge 404, the scraper 602 adapted to push harvested mature algal turf 50 generally toward the outer edge 404, adjacent which are positioned means for collecting the harvested algal turf 50, typically a drain 424.

In use, the drain 424 would have been previously shut down and the turf 50 dewatered prior to the harvesting. Plowing from the center outward aids the harvesting process because of the availability of ever-increasing area into which to plow harvested turf 50 as the harvester 60 moves outward. Harvesting at night or during times of low light has been found to aid in retaining healthy basal holdfasts, since the first-harvested regions are subject to less drying during a completion of the harvest.

Figure 5:
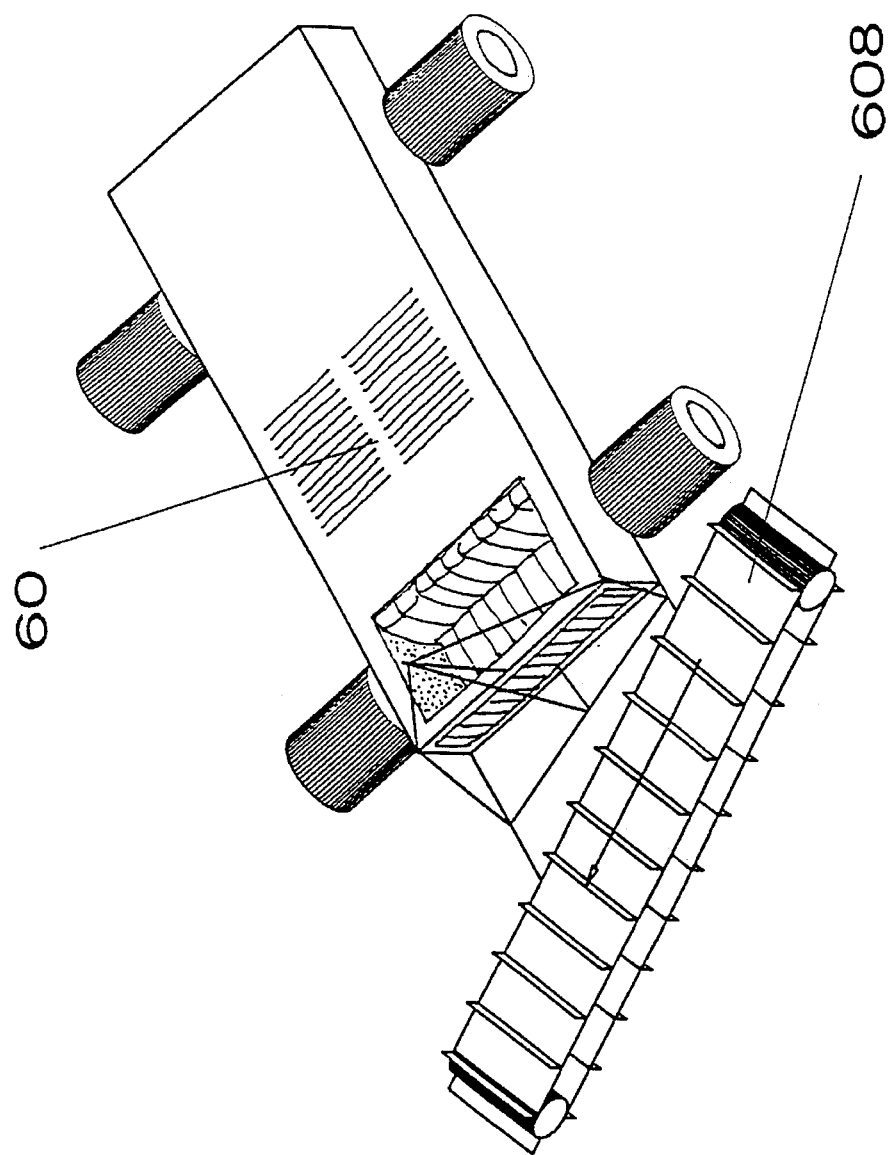
FIG. 5 is a partial axionometric view of an alternate embodiment of the harvester utilizing a conveyer belt.

A further embodiment of the scraper comprises a rotatable ribbed conveyer belt 608, as illustrated in FIG. 5.

In particular locations, the water to be cleansed has been found to have a pH level below an optimal value for algal growth. For instance, at the Department of Energy site in Butte, Mont., inflowing water has been found to have an extremely low pH value (~2). At such low pH levels algae cannot grow. The addition of an alkaline substance such as calcium phosphate to the water either prior to or immediately after entering the floway 40 serves the dual purpose of buffering and adding nutrient phosphorus for the algae's consumption.

It is known that important variables in the optimization of a floway's attributes are the parameters of water flow. In general, causing water to flow over the algal turf at varying rates enhances bioassimilation and encourages algal diversity.

One method of achieving water articulation is to create surges by the use of a periodically operating lightweight, buoyant piston as described in the present inventor's U.S. Pat. No. 5,131,820.

As mentioned previously, a variable speed of the water flow is often of greater importance than a surging action. This is a natural attribute of a conical scheme.

Another method of delivering water to the floway 40 comprises providing a lightweight cylindrical weir that is raised slightly by a device operating on higher-pressure water than the inflow (say 20 psi). Water is fed through the standpipe 412 and the pressure conduit. When a tripping mechanism is released, as liquid fills the weir, the cylindrical weir rises and releases the contents of the cylinder under the edge of the weir, after which the cylinder falls and refills for the next cycle.

Although a particular speed of operation is not to be taken as a limitation, it is desired that a flow or surge of water pass over the algal turf 50 at a rate to maintain a diverse assemblage of algae. A preferred device is designed to articulate the water and affect the growth of certain and varying algal turf species that may dominate a portion of the growing area. Consequently different filtration objectives may support different flow and articulation flow speeds and strength variations, and these variations can be manipulated to tune the algal turf floway 40 to suit the water filtration objectives.

For example, algae in high flow zones can tolerate greater flow variations such as a 1–10× increase over minimum algal turf community sustenance levels. This type of environment stimulates the proliferation of filamentous algae that are generally better suited to removal of reactive nutrients and pollutants.

Water in low flow zones is capable of supporting more fragile plant assemblages, as well as diatom proliferation and attachment. These areas are not as stable in variable flow environments, but they display optimal particulate trapping ability. The present invention is of sufficient breadth that various techniques may be utilized as are appropriate in a selected instance for a given water system filtration requirement.

The preferred floway elevation 407 is dependent upon the floway radius 406 and slope 408. A typical elevation 407 is in the range of 1 to 96 inches, but this is not intended to be a limitation. In some locations, such as in a fallow field during harvesting, algal turf can be grown in a flooded location where virtually no slope is present.

There is a desirable range of water depths on the culture surface that is required to maximize the device performance. As an example, algae are rooted on substrate support algal plant canopies and epiphytic (clinging) plants and other organisms attached to plants that will grow to fill between 0.5 and 12 in. of water.

So while a desired depth of water in the floway is from 1 to 3 in., tolerances for the process have been shown to work satisfactorily up to 6 in., and depths to 12 in. are acceptable in some places.

A floway system, also known as a farm 10, comprises multiple floways 40, as shown in FIG. 3, including a first 42 and a second 44 floway, each having the same attributes as previously described floway 40. The farm 10 further comprises a means, such as a pipeline 102, for transporting water in series from the outflow weir 416 of the first floway 42 to the standpipe 412 of the second floway 44.

In use, water is admitted into the first floway 42 from the waterway by the standpipe 412, is permitted to flow over the algal turf 50 growing on the first floway bottom surface 418. The water is then discharged from the first floway outflow weir 416 after a predetermined time in a cleaner condition and is transported to the second floway standpipe 412. The water then is permitted to flow over the algal turf 50 growing on the second floway bottom surface 418, and is discharged from the second floway outflow weir 416 after a predetermined time in a cleansed condition.

One advantage of a multiple-unit culture facility or farm 10 is that harvesting of mature algal turf 50 can take place in one floway 42 that has been previously dewatered while others take a diverted flow. This is accomplished by having a multiplicity of floways that can be designed to handle slightly more flow so that one floway can be taken out of service for dewatering and harvesting while others take its flow.

A method for controlling an undesirable microorganism population level in a conical algal turf floway such as described above comprises the steps of growing an algal turf on the bottom surface, wherein the algal turf comprises an algal species and an undesirable microorganism population. Next water is caused to flow over the algal turf and then is discharged from the outer edge of the floway. Next the mature algal turf is harvested from the bottom surface of the floway, and the culture surface is permitted to dry for a time sufficient to significantly reduce the population level of the undesirable microorganism but insufficient to eradicate the algal species in the algal turf. Some algal species increase reproduction as they dry out and if these species are desired the practice of partial or complete dryout may be used to initiate greater sporogenesis.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of the preferred embodiment thereof, and the advantageous new and useful results obtained thereby, the new and useful constructions, and reasonable mechanical equivalents thereof obvious to those skilled in the art, are set forth in the appended claims.

What is claimed is:

1. A generally conical floway for cleansing water from a waterway of a pollutant, the floway having an inner central region, an outer circumferential edge, a radius, and a downward slope between the central region and the outer edge, the floway comprising:

means for admitting the water to be cleansed positioned at the central region;

means for retaining water within the floway positioned around the outer edge, the retaining means comprising means for discharging cleansed water from the floway, the discharging means movable between an open position and a closed position; and a water-impervious bottom surface extending from the central region to the outer edge, the bottom surface having a texture conducive for growing a bed of algae to form an algal turf thereon;

wherein, in use, water is admitted into the floway from the waterway by the admitting means, is permitted to flow over the algal turf growing on the bottom surface, the algal turf serving as means for removing the pollutant from the water to be cleansed and thereby cleansing the water, and is discharged from the discharging means after a predetermined time in a cleansed condition.

2. The conical floway recited in claim 1, wherein the retaining means comprises a circumferential wall and the discharging means comprises a weir.

3. The conical floway recited in claim 2, wherein the central region has a hole therein and the admitting means comprises the hole in the central region, and further comprising means for transporting the water to be cleansed from the waterway to the hole in the central region.

4. The conical floway recited in claim 3, wherein the transporting means comprises a standpipe.

5. The conical floway recited in claim 3, wherein the bottom surface comprises a plurality of generally upwardly-extending diversion tabs for trapping filamentous algae and particulates and further for enhancing mixing of flowing water and for preventing the flowing water from forming channels between the central region and the outer edge.

6. The conical floway recited in claim 3, further comprising means for harvesting mature algal turf from the bottom surface, wherein in use the harvesting means is utilized at predetermined intervals to harvest mature algal turf, the harvester adapted to remove mature algal turf from the bottom surface and to avoid removing algal holdfasts from the bottom surface, thereby permitting algal turf regeneration following harvesting.

7. The conical floway recited in claim 6, wherein the harvesting means comprises a harvester pilotable along a generally spiral pathway between the central region and the outer edge.

8. The conical floway recited in claim 7, wherein the harvester comprises scraping means adapted to remove mature algal turf from the bottom surface and to avoid removing algal holdfasts from the bottom surface.

9. The conical floway recited in claim 8, wherein the scraping means comprises a rotatable scraper.

10. The conical floway recited in claim 8, wherein the scraping means comprises a rotatable ribbed conveyer belt.

11. The conical floway recited in claim 8, wherein the harvester is adapted to move downward along a generally spiral pathway from the central region to the outer edge, the scraping means adapted to push harvested mature algal turf generally toward the outer edge.

12. The conical floway recited in claim 11, further comprising means for collecting harvested algal turf positioned adjacent the outer edge.

13. The conical floway recited in claim 1, wherein the algal turf removes pollutants by a process selected from the group consisting of bioassimilation, precipitation, and trapping.

14. The conical floway recited in claim 1, wherein the water to be cleansed has a pH level below an optimal value for algal growth, the floway further comprising means adjacent the admitting means for introducing an alkaline substance into the water to be cleansed for raising the pH of the water, thereby enhancing algal growth.

15. The conical floway recited in claim 1, further comprising means for causing water to flow over the algal turf at varying rates, the rate varying means enhancing bioassimilation and encouraging algal diversity.

16. A system for cleansing water from a waterway of a pollutant, the system comprising:

a first and a second floway, each floway having an inner central region, an outer circumferential edge, a radius, and a downward slope between the central region and the outer edge, each floway comprising:

means for admitting the water to be cleansed positioned at the central region;

means for retaining water within the floway positioned around the outer edge, the retaining means comprising means for discharging cleansed water from the floway, the discharging means movable between an open position and a closed position; and a water-impervious bottom surface extending from the central region to the outer edge, the bottom surface having a texture conducive for growing a bed of algae to form an algal turf thereon; and means for transporting water in series from the discharging means of the first floway to the admitting means of the second floway;

wherein, in use, water is admitted into the first floway from the waterway by the admitting means, is permitted to flow over the algal turf growing on the first floway bottom surface, the algal turf serving as means for bioassimilating the pollutant from the water to be cleansed and thereby cleansing the water, is discharged from the first floway discharging means after a predetermined time in a cleaner condition, is transported to the second floway admitting means, is permitted to flow over the algal turf growing on the second floway bottom surface, the algal turf serving as means for bioassimilating the pollutant from the water to be cleansed and thereby cleansing the water, and is discharged from the second floway discharging means after a predetermined time in a cleansed condition.

17. A method for cleansing water from a waterway of a pollutant using a conical floway, the floway having an inner central region, an outer circumferential edge, a radius, a downward slope between the central region and the outer edge, and a bottom surface conducive for growing an algal turf thereon, the method comprising the steps of:

growing an algal turf on the bottom surface, the algal turf comprising an algal species capable of bioassimilating the pollutant;

flowing the water to be cleansed over the algal turf;

permitting the algal turf to bioassimilate the pollutant; and discharging water from the outer edge of the floway after a predetermined time.

18. The method recited in claim 17, wherein an undesirable microorganism population is growing on the bottom surface along with the algal turf, further comprising the step of controlling the undesirable microorganism population level by, following the discharging step:

harvesting mature algal turf from the bottom surface of the floway; and permitting the culture surface to dry for a time sufficient to significantly reduce the population level of the undesirable microorganism but insufficient to eradicate the algal species in the algal turf.

19. The method recited in claim 17, further comprising the step, following the discharging step, of performing a thinning harvest of mature algal turf from the bottom surface of the floway for enhancing postharvest regrowth and for enhancing contact of the water to be cleansed with the algal turf.

20. The method recited in claim 17, wherein the water to be cleansed has a pH value below an optimal pH value for promoting algal growth, further comprising the step, prior to the flowing step, of raising the pH of the water to be cleansed.

21. The method recited in claim 20, wherein the pH raising step comprises adding calcium phosphate generally adjacent the admitting means, the calcium phosphate further providing phosphorus to the algal turf during bioassimilation, thereby providing an additional nutrient source for the algal turf.

22. The method recited in claim 17, further comprising the step, following the discharging step, of harvesting mature algal turf from the bottom surface of the floway during a nighttime period, thereby minimizing a drying of a harvested area of the floway during a completion of the harvesting.

\* \* \* \* \*